April 16, 1940. L. C. BARNES 2,197,514
PHOTOELECTRIC ATTACHMENT FOR SCALES
Filed Oct. 28, 1937 2 Sheets-Sheet 1

INVENTOR
LEWIS C. BARNES
BY
Orton and Griswold
ATTORNEYS

April 16, 1940.  L. C. BARNES  2,197,514
PHOTOELECTRIC ATTACHMENT FOR SCALES
Filed Oct. 28, 1937  2 Sheets-Sheet 2
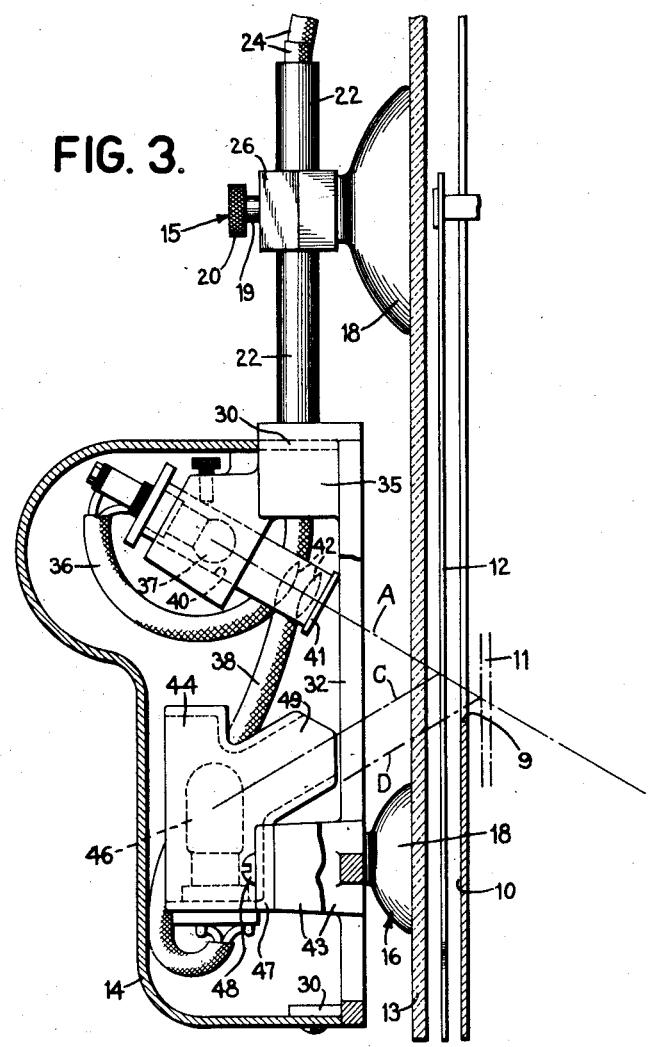
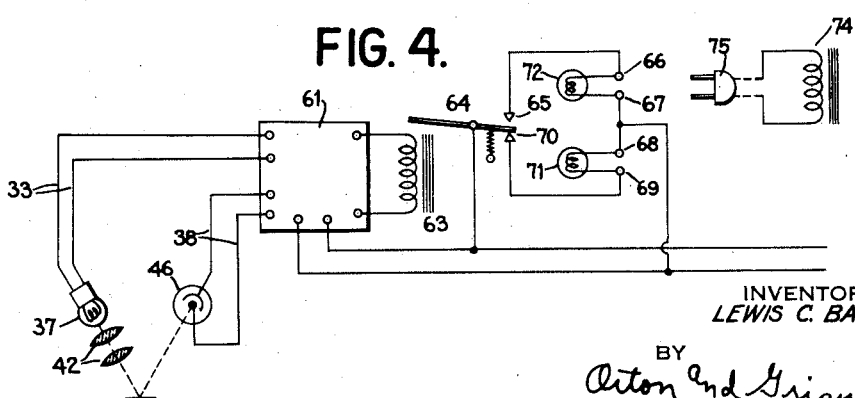
INVENTOR
LEWIS C. BARNES
BY
Orton and Griswold
ATTORNEYS Patented Apr. 16, 1940

2,197,514

UNITED STATES PATENT OFFICE 2,197,514

PHOTOELECTRIC ATTACHMENT FOR SCALES

Lewis C. Barnes, Rutland, Vt., assignor to The Howe Scale Company, Rutland, Vt., a corporation of Vermont Application October 28, 1937, Serial No. 171,408

4 Claims. (Cl. 250—41.5)

This invention relates broadly to weighing devices and more particularly to scales of the kind in which a hand or pointer moves over graduations on a dial.

It has heretofore been proposed to associate, with weighing devices, instrumentalities whereby respective ingredients composing a batch may be weighed seriatim and to control the ingredient delivering means whereby, after one ingredient is weighed, the delivery of the next ingredient is automatically effected, such delivery being effected when the scale is balanced in recording the weight of the ingredient previously delivered. It has also been proposed to control material feeding or delivering devices whereby equal weights of a material may be successively delivered, as for instance, where a series of containers are each adapted to be filled with the same weight of material.

The primary object of the present invention is a controlling device for material delivering means, such as a hopper gate, responsive to a predetermined position of the pointer or indicating hand of a dial scale.

Another object of the invention is a device of the character described which may be readily applied and removed as an attachment for existing scales.

Still another object of the invention is a device of the character described making use of light responsive devices.

The invention also seeks a device of the character described which is practical from the standpoint of ease and cheapness of manufacture, is characterized by simplicity of parts and is readily and easily installed and removed, while at the same time lending itself to permanent installation and which is, moreover, capable of being used alone or in multiple to accomplish the ends sought.

These and other objects of the invention and the means for their attainment will be more apparent from the following detailed description, taken in connection with the accompanying drawings illustrating one embodiment by which the invention may be realized and in which:

Figure 3 is a view in vertical section of the light sensitive controlling unit of this invention; and Figure 4 is a wiring diagram.

Figure 1:
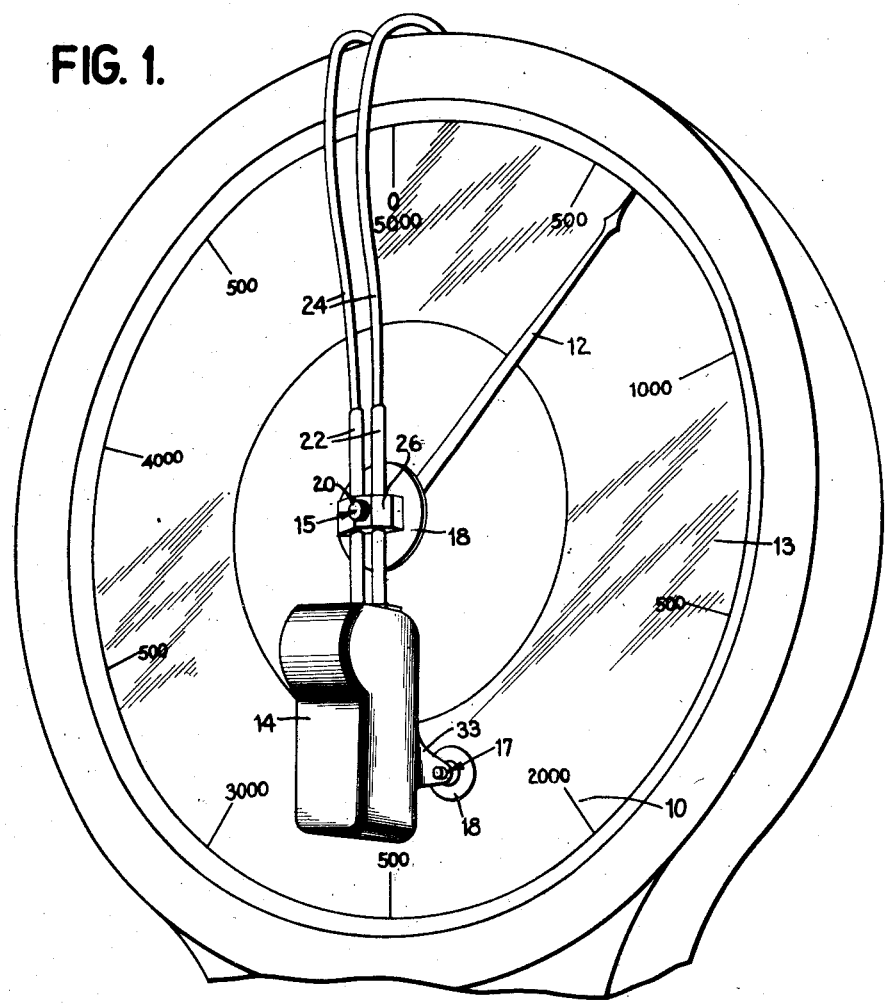
Figure 1 is a view showing a conventional scale, in front elevation, to which the device of this invention is attached.

Referring first to Figure 1, the scale there represented is illustrative of any weighing device having a graduated dial 10 over which a hand or pointer 12 travels. Usually the graduated dial, in a scale, is enclosed or covered by a transparent plate 13 (Figure 3), such as glass, the hand 12 travelling beneath the glass.

In the illustrated embodiment, light responsive devices are carried within a housing 14 removably or permanently carried on the glass 13. For instance, in the illustrated embodiment, a single device, which will thus respond to the same weight of material repeatedly weighed, is shown as supported from three points, as at 15, conveniently at or near the center of the dial, and at 16 and 17 nearer the periphery of the dial 10 and this support is conveniently effected from the glass cover as by suction cups 18 which may, if desired, be secured to the glass 13 as by an adhesive, where the device is to remain in position on the scale for any length of time.

It will be appreciated, assuming the mounting 15 to be disposed approximately in the axis of the pointer 12, that a plurality of groups of mountings 16 and 17, of any convenient kind, may be disposed permanently about the perimeter of the dial 10, at predetermined calibrated points, whereby the member 14 may be quickly and easily located to respond to the points of control desired, as indicated by the position of the pointer. Each of these suction cups 18, in the illustrated embodiment, is provided with a threaded spindle 19 receiving an apertured element of the housing 14, the housing 14 being retained in place by thumb nuts 20. As shown, the housing 14 carries at the uppermost portion thereof, two parallel tubular conduit members 22 through which electric cables 24 may pass, respectively, and which also serve as supporting members or ways for a reciprocable or adjustable slide 26 formed with the aperture through which the threaded spindle 19 from the suction cup 15 passes. Thus the housing 14 is located with respect to the pointer 12 by relative movement of the slide 26 with respect to the guiding tubes 22, the slide 26 being secured in adjusted position by means of a set screw 28 or the like.

The housing 14 (Figure 3) contains a source of light and a light responsive device, both or either of which may, if desired, be relatively adjustable. Referring now to Figure 3, the housing 14 is adapted to be removably secured, as by screws or the like, to upstanding ears 30 on a rectangular frame member 32, with which the outstanding apertured ears 33 receiving the cup spindles 18 are conveniently integral. At the uppermost end of the frame 32, as viewed, is the boss 35 in which the guide tubes 22 are mounted. Through one of these tubes 22, a cable containing the electrical conductors 36 for the light source (lamp 37) enters the housing and through the other tube 22 a cable enters containing the electrical conductors 38 for a light responsive device, such as a photoelectric cell 46. In its uppermost portion, the boss 35 is formed with a generally cylindrical passage 40 adjustably receiving a lamp enclosure formed with a light passage and shown as a tube 41 within which is disposed the lamp 37 carried in a socket in the tube, and a lens system 42.

Mounted on two spaced upstanding lugs 43 near the other end of the frame 32 is a carrier 44—47 for a photoelectric cell 46. This carrier consists generally of a cylindrical portion 44, adapted to receive the socket for the photoelectric cell 46, having integral slotted lugs 47 adapted to be removably and adjustably secured, as by screws 48, to the respective ears 43 on frame 32. Opening into the lowermost portion of this cylindrical part 44, at an appropriate angle thereto, is a branch passage 49, conveniently rectangular in cross-section, which serves as a light passage leading to the photoelectric cell. By means of the adjustment 47, 48, the photoelectric cell may be exactly positioned to receive reflected light from the light source in the enclosure 41. The member 44—47, in its entirety, serves to seal the photoelectric cell from the influence of any light except the light from the tube 41 which is purposely reflected, in the operation of the device, to perform the function of control.

Figure 2:
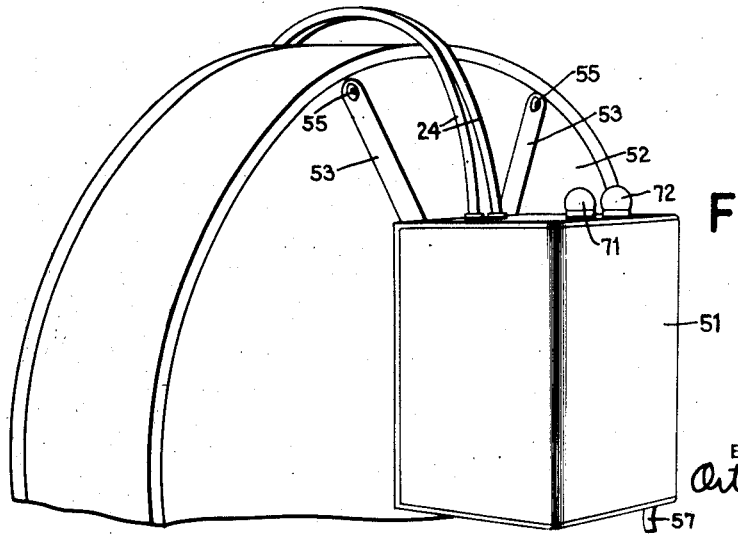
Figure 2 is a fragmentary view showing the scale of Figure 1 in rear elevation and other portions of the device of this invention.

Referring to Figure 2, a casing 51 is shown as carried, for convenience, on the back closure 52 of the scale. As illustrated, the casing 51 is supported by a pair of links 53 which are apertured at their upper ends for support on the screws 55 by which the back closure 52 of the scale is removably secured in place. This housing 51 carries the instrumentalities by which the current changes, initiated by the photoelectric cell, functioning as a relay switch, are used to actuate or control a relay controlling a material delivering device, for instance, or an indicating device to indicate when the desired load is on the scale, i. e., the gauge point. Current from a current supply is available through the cable 57 and this current is suitably reduced within the housing 51 for the supply of the lamp 37.

Referring now to Figure 4 showing, diagrammatically, the wiring diagram of this invention, the photoelectric cell 46 is connected as by the leads 38 to an amplifier 61 connected with the solenoid 63 of a relay 64. One contact 65 of the relay is connected with one terminal 66 of a receptacle 66, 67, the terminal 67 of which is in parallel with the corresponding terminal 68 of the second outlet receptacle 68, 69, the terminal 69 of which is connected with the other contact 70 of the relay. Across, i. e., in parallel, the respective pairs of terminals are the pilot lights 71 and 72. Either one of these two pairs of contacts 66, 67 or 68, 69 may be connected with a current consuming device 74, which may be a motor to operate a gate in an ingredient hopper or a control device used to start and stop a material conveying device or, for that matter, may be any power consuming device such as an indicator, a lamp or bell, adapted to be illuminated or caused to emit a sound, as the case may be, to indicate when the pointer reaches the predetermined graduation on the scale. Such current consuming device is indicated at 74, in series with an ordinary pronged contact plug 75 for reception in and electrical connection with either of the outlets 66, 67. The pilot lights may be contrastingly colored. For instance, the pilot light 71 connected with the relay contact 70 which is normally closed, may be a white light while the other pilot light, connected with a contact which is normally open, may be a red light. Thus the white light will be illuminated for all positions of the hand 12 except when the hand 12 coincides with the predetermined graduation and the circuit is completed by the photoelectric cell, at which time the red light will be illuminated. These two pilot lights give a visible indication on the outside of the casing 51 as to which contact 70 or 65 is made. The current consuming device 74 may be connected with either contact depending upon the characteristics of the current consuming device. Thus the current consuming device 74 may be energized through the contact 64, 70 by plugging in to contacts 68, 69 at such time as no light is reflected to the photoelectric cell as for instance, in order to cause a conveyor to travel and be deenergized when light is reflected to the photoelectric cell when the contacts 64, 65 are made, thus ceasing the delivery. Similarly, the current consuming device 74, as for instance a hopper gate actuating motor, may be rendered inoperative if the connection therewith is made with the contact 66, 67. Then, when light is reflected to the photoelectric cell 46, it is rendered operative to operate the motor and open the gate. That is, when the pointer 12 reaches the predetermined graduation and reflects light to the photoelectric cell 46, it causes the energizing of relay 63, closing contacts 64, 65 and thus energizes the power device 74.

The operation of the controlling device of this invention will be apparent from the foregoing description. Let it be assumed, for purposes of illustration, that the control device 14 is so disposed above the face of dial 10 that the light beam will be reflected by the pointer 12 when it points to 2500 pounds, it being assumed in this illustration that a succession of loads of 2500 pounds is to be weighed. Depending, of course, upon the characteristics of the pointer 12, the light beam from the lamp 37 may not fall directly on the perpendicular plane passing through the 2500 pounds graduation on the dial since the pointer may, for instance, be wider at that point where it intercepts the light beam than at its extremity where it coincides with the 2500 pounds mark, and hence a portion of this pointer will be moved into position to intercept the light ray before the extremity coincides with the desired graduations. For this reason, the control device 10 will be disposed slightly past the predetermined graduation on the dial so that the light ray will be intercepted and reflected simultaneously with the extremity of the hand reaching the predetermined graduation. Then, of course, when the pointer reaches the predetermined graduation, the light beam is reflected back from the pointer on to the photoelectric cell switching device to complete the circuit through the relay control and actuate the hopper gate to close the gate and cut off the flow of material into the container. A manual switch in the circuit may then deenergize the circuit until the next container to be filled is in position when the switch is manually closed and the pointer having at that time returned to initial or zero position, the operation may be repeated. In the illustrated embodiment, the dial 10 is shown as having an opening 9 at the center into which the light ray A from the lamp 37 may pass and thus not be reflected back into the photoelectric cell. However, due to the adjustability of the lamp carrier and the photoelectric cell housing, the carrier and housing may be so related that the light ray, should it be reflected back, as indicated at D, from the face of a continuous dial as indicated in broken lines at 11, will fall outside of the passage 45 through which light may pass to the photoelectric cell, whereas when the pointer 12 reaches a position to intercept the light ray, such light ray will be reflected along the path C into the passage 45 to fall on the photoelectric cell. This adjustment permits the control device of this invention to be applicable irrespective of the configuration of the pointer and thus renders the control device applicable to any type of scale, since the photoelectric cell housing is adjustably mounted so that a wide angle of reflected light can be received and by taking advantage of the plug and jack circuit modifying arrangement, the control device of this invention becomes attachable to any dial scale to control any power device for any purpose whatsoever.

Clearly, also, several of these control devices 14 may be disposed about the face of the dial for batch weighing so that, for instance, a hopper gate may be actuated at zero position to deliver the first batch of material and be closed again when the desired amount of material, say, 500 pounds, has been weighed, the pointer 12 at that time registering with the 500 graduation on the scale. The next ingredient to be weighed may be of 1500 pounds weight and the hopper gate again opens, as at the 500 graduation, and may be closed again at the 2000 graduation by a second control device 14 located in operative relation with the 2000 pounds graduation on the dial 10. Additional fractions, of course, may be weighed by the provision of additional control devices at selected points further on along the graduations on the dial.

It will thus be seen that a high speed control and indicating device has been provided which meets the requirements of modern mass production in a device which is applicable to any dial scale so that any dial scale may be quickly and easily converted for automatic weighing and filling operations which are carried out at high speed and with precision without in any way interfering with the scale mechanism or requiring any alterations, changes or adjustments therein. This invention is moreover quickly and readily adjustable over the full 360° of the dial and is simply and easily installed without the requirement of special tools.

Various modifications will occur to those skilled in the art in the composition, configuration and disposition of the component elements going to make up the invention as a whole, and no limitation is intended by the phraseology of the foregoing description or illustrations in the accompanying drawings, except as indicated in the appended claims.

What is claimed is:

1. In a weight responsive control for power consuming devices, for use with a scale having a pointer travelling over a dial, the combination of a self-contained attachment comprising a rectangular frame, a casing enclosing the same, said frame being formed with a tubular bearing, a tube in the bearing, a lamp socket in the tube, an optical system in the tube, means to adjustably secure the tube in the bearing, a carrier for a photoelectric cell formed with a passage leading thereinto, a socket for a photoelectric cell in the tubular carrier, a pair of spaced conduits carried by the frame in prolongation thereof, ears upon opposite sides of the frame remote from the conduits, means adjustably carried with the conduits and each ear to removably support the attachment on a surface of the scale.

2. In a weight responsive control for power consuming devices for use with a scale having a pointer travelling over a dial, the combination of a self-contained attachment comprising a rectangular frame, a casing enclosing the same, a tube carried by the frame, a lamp socket in the tube, an optical system in the tube, said frame being formed with a pair of spaced bearing surfaces, a tubular carrier for a photoelectric cell formed with an angularly related rectangular passage leading thereinto, a socket for a photoelectric cell in the tubular carrier, means to adjustably secure the carrier on the bearing surfaces, a pair of spaced conduits carried by the frame in prolongation thereof, ears upon opposite sides of the frame remote from the conduits, means adjustably carried with the conduits and means carried with each ear to removably support the frame on a surface of the scale.

3. In a weight responsive control for power consuming devices for use with a scale having a pointer travelling over a dial, the combination of a self-contained attachment comprising a lamp, an optical system through which light from the lamp is directed, a photoelectric cell to receive reflected light from the lamp, a pair of spaced conduits carried by the frame in prolongation thereof, a cable in one conduit connected with the lamp, a cable in the other conduit connected with the photoelectric cell, means adjustably carried with the conduits to removably support an end of the attachment on a surface of the scale and means remote therefrom to removably support the other end of the attachment on said surface.

4. In a weight responsive control for power consuming devices for use with a scale having a pointer travelling over a graduated dial, the combination of a self-contained attachment comprising a lamp, an optical system receiving light from the lamp, a photoelectric cell to receive reflected light from the lamp, a pair of spaced conduits carried by the attachment in prolongation thereof, a slide on the conduits and a suction cup pivotally carried with the slide to removably and adjustably support the same on a surface of the scale.

LEWIS C. BARNES.